(12) United States Patent
Blount

(10) Patent No.: US 6,492,444 B1
(45) Date of Patent: Dec. 10, 2002

(54) ORGANIC PHOSPHORUS-PHOSPHORUS OXYACID COMPOUNDS

(76) Inventor: David H. Blount, 6728 Del Cerro Blvd., San Diego, CA (US) 92120

( * ) Notice: Subject to any disclaimer, the term of this patent is extended or adjusted under 35 U.S.C. 154(b) by 11 days.

(21) Appl. No.: 09/722,154

(22) Filed: Nov. 27, 2000

(51) Int. Cl.⁷ ..................... C08K 5/3333; C08K 5/521; C08K 5/5313
(52) U.S. Cl. ...................... 524/123; 524/123; 524/124; 524/126; 524/127; 252/609; 106/18.14
(58) Field of Search .............................. 558/155; 562/12, 562/20; 524/123, 124, 126, 127; 252/609; 106/18.14

(56) References Cited

U.S. PATENT DOCUMENTS

| 3,664,974 A | * | 5/1972 | Cohen et al. |
| 5,430,081 A | * | 7/1995 | Ohmae et al. |
| 5,788,915 A | * | 8/1998 | Blount |
| 5,888,650 A | * | 3/1999 | Calhoun et al. |
| 6,054,515 A | * | 4/2000 | Blount |

* cited by examiner

*Primary Examiner*—Peter Szekely

(57) ABSTRACT

Flame retardant organic phosphorus-phosphorus oxyacid compounds are produced by mixing and reacting a phosphorus halide, phosphorus oxyacid and an organic compound. This organic phosphorus-phosphorus oxyacid compound may be reacted with a basic compound to produce a flame retardant salt of organic phosphorus-phosphorus oxyacid. The organic phosphorus-phosphorus oxyacid and/or it's salt may be mixed with or applied on a flammable organic material to make it less flammable. A flame retardant composition may be produced by mixing or reacting the organic phosphorus-phosphorus oxyacid or it's salt with carbonization auxiliaries, carbonization accelerators, comb-like polymer and a filler. This composition may be mixed in or applied on a flammable organic material to make it less flammable.

13 Claims, No Drawings

ORGANIC PHOSPHORUS-PHOSPHORUS OXYACID COMPOUNDS

This application concerns novel flame retardant organic phosphorus-phosphorus oxyacid compounds and compositions. These compounds contain two or more phosphorus atoms in each molecule. The flame retardant compounds of this invention may be utilized as flame retardants by incorporating these compounds within or coating a more flammable organic material. In particular, it relates to flame retardant compounds and a flame retardant organic resin compositions, which are free from toxicity problems due to the absence of halogen gas generated during combustion or molding as in the use of a halogen-containing flame retardant compound.

BACKGROUND OF THE INVENTION

Basic nitrogen containing salts of organic polyphosphorus compounds were produced by Blount in U.S. Pat. No. 6,054,515 and utilized in flame retardant compositions. The organic phosphorus-phosphorus oxyacids compounds of this invention are novel. These novel compounds are an improvement over the basic salts of organic polyphosphorus compounds because they are a much better flame retardant compounds and cost less to produce. When the organic phosphorus-phosphorus oxyacid compound is incorporated in or on a flammable organic material it produces an intumescent composition. When this intumescent composition is exposed to a flame for a few seconds it begins to char and form bubbles within the char thereby protects the substrate against heat and fire damage for an appreciable time. This intumescence also reduces the amount of smoke produced. The organic phosphorus-inorganic phosphorus oxyacid compounds promote initial intumescence at a low temperature, which is much lower that required when a basic nitrogen salt of organic polyphosphorus compound or an organic phosphorus compound is utilized as the flame retardant compound. The flame retardant compounds of this invention will also with stand a higher temperature than the organic phosphorus compounds and basic nitrogen containing salts of organic polyphosphorus compounds before decomposing, and allows them to be mixed in thermoplastic resin to produce flame retardant reins.

The object of this invention is to produce organic phosphorus-inorganic phosphorus oxyacid compounds, it's salts and compositions containing these compounds which are capable of rendering organic material less flammable. These flame retardant compounds may be used in the production of insulation foam, flexible foams, building components, coating agents, surfactants, molded plastic products and many other uses.

SUMMARY OF THE INVENTION

In one respect, the invention comprises reacting phosphorus halogen compounds, containing phosphorus atom with a valence of 3–4, with an inorganic phosphorus oxyacid compounds with phosphorus atoms with a valence of 5 and an organic compound to produce organic phosphorus-inorganic phosphorus oxyacid compounds. Another aspect, the invention comprises utilizing the organic phosphorus-phosphorus oxyacid of this invention by incorporating in, or apply on a more flammable organic material to render the organic material less flammable. Another aspect of the invention is a process to prepare the organic phosphorus-phosphorus oxyacid compound comprising contacting and reacting:

A) a phosphorus halide compound containing a phosphorus atom with a valence of 3–4;
B) an inorganic phosphorus oxyacid compound containing a phosphorus atom with a valence of 5;
C) an organic compounds that will react with a phosphorus halide or a phosphorus oxyacid; under conditions sufficient to prepare the organic phosphorus-inorganic phosphorus oxyacid compound.

Organic phosphorus-phosphorus oxyacid compounds has the general formula of:

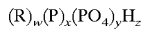

$(R)_w(P)_x(PO_4)_yH_z$

Wherein x is a number 1–4, y is a number 1–3, z is a number 3 to 9 and w is a number 1–3 and selected from the compounds containing a radical selected from the group consisting of:

—SH, —CH$_2$Cl, —CH$_2$Br, CH$_2$I, —CN, —NO, —COCl, —COBr, —SO$_2$Cl, —SO$_2$Br, —COOH, —S$_2$OH, COO—,

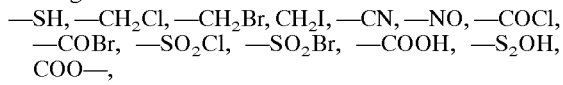

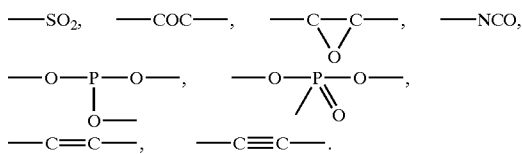

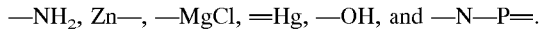

—NH$_2$, Zn—, —MgCl, =Hg, —OH, and —N—P=.

Another aspect of this invention is to produce a flame retardant composition which comprising mixing and reacting:

A) a phosphorus halide compound containing a phosphorus atom having a valence of 3–4;
B) an inorganic phosphorus oxyacid compound containing a phosphorus atom with a valence of 5;
C) an organic compounds that will react with a phosphorus halide and/or a phosphorus oxyacid; then add and mix or react
D) carbonization auxiliaries;
then add and mix
E) carbonization accelerating compounds;
F) heat reflecting substance;
G) filler;
under conditions sufficient to prepare the organic phosphorus-inorganic phosphorus oxyacid compound.

In another aspect, according to this invention there is provided a flame retardant basic salt of organic phosphorus-phosphorus oxyacid compound and composition produced by a process comprising of mixing and reacting:

A) phosphorus halide compound containing a phosphorus atom having a valence of 3–4;
B) inorganic phosphorus compound containing a phosphorus atom having a valence of 5;
C) organic compound that will react with a phosphorus halide or a phosphorus oxyacid; then add, mix and react;
H) basic inorganic or organic salt forming compound, thereby producing a basic salt of organic phosphorus-phosphorus oxyacid;
then add and mix
D) carbonization auxiliaries;
E) carbonization accelerating compounds;
F) heat reflecting compound;
G) filler;
under conditions sufficient to prepare the salt of organic phosphorus-phosphorus oxyacid.

In another aspect, according to this invention, there is provided a flame retardant thermoplastic resin composition which comprises (1) thermoplastic resin, (2) organic phosphorus-phosphorus oxyacid or it's salt, (3) carbonization auxiliaries, (4) metal containing compound having a carbonization accelerating effect, (4) comb-like polymer and (5) filler.

The components may be utilized in any suitable amount but preferably:
1. An phosphorus halogen compound, which contains a phosphorus atom containing a valence of 3 or 4, in the amount of 25 to 100 parts by weight;
2. Inorganic phosphorus oxyacid compound, which contains a phosphorus atom with a valence of 5, in the amount of 10 to 100 parts by weight;
3. Organic compound that will react with a phosphorus halide and/or phosphorus oxyacid, in the amount of 10 to 100 parts by weight;
4. An amount of 5% to 30% by weight of the flame retardant compound or composition is added to or on the flammable organic material;
5. Basic salt forming compound in the amount of 0 to 100 parts by weight;
6. metal containing compound having a carbonization accelerating effect in the amount of 0 to 30 parts by weight;
7. Comb-like polymer, in the amount of 0 to 30 parts by weight
8. Heat reflecting compound, in the amount of 0 to 30 parts by weight.
9. Carbonization auxiliaries, in the amount of 0 to 100 parts by weight.
10. Filler, in the amount of 0–200 parts by weight.

COMPONENT A

Any suitable phosphorus halide compound, that contains a phosphorus atom with a valence of 3–4, may be used in this invention, such as, but not limited to, phosphorus trihalides such as phosphorus trichloride, phosphorus tribromide, phosphorus triflouide, phosphorus triiodide, and phosphorus with a valence of 5 such as phosphorus pentachloride, phosphorus pentabromide, phosphorus pentaflouride, and phosphorus oxyhalides, such as phosphorus oxytrihalides such as phosphorus oxytrichloride, phosphorus oxytribromide and phosphorus oxytriflouride. Phosphorus trichloride is the preferred phosphorus halide compounds.

COMPONENT B

Any suitable inorganic phosphorus oxyacid compound which contains a phosphorus atom with a valence of 5 may be used in this invention. Suitable inorganic phosphorus compounds include, but not limited to, phosphoric acid, polyphosphoric acid, pyrophosphoric acid, phosphorus oxide, salts of hydrogen phosphoric acid, phosphonic acid, ammonium hydrogen phosphate, ammonium polyphosphate, triphosphorus acid, phosphinic oxide, phosphorus esters, phosphorus trioxide, phosphorus pentioxide, metaphosphoric acid, phosphorus acid, hypophosphorus acid, and mixtures thereof. Phosphoric acid is the preferred inorganic phosphorus oxyacid.

COMPONENT C

Any suitable organic compound that will react with a phosphorus halide and or a phosphorus oxyacid may be utilized in this invention. Suitable organic compounds maybe substituted, saturated or unsaturated or mixtures thereof. Suitable organic compounds are organic compounds with one or more active hydrogen and/or halide and/or metal radicals. These compounds may be aliphatic, aromatic, aliphatic-aromatic, heterocyclic and mixtures thereof. Suitable organic compounds include, but not limited to, alcohols, polyalcohols, alkylalcoholamines, epoxides, polyepoxides, epichlorohydrin, chlorohydrin, organic halide may also be used such as alkyl halide, carboxylic acids and anhydrides, polycaboxyl acids and anhydrides, isocyanates, polyisocyanates, thioalcohols, thiophenols, phenoplasts, aldehydes, halogenated alcohols and polyalcohols, halogenated organic acids and polycarboxyl acids, sulphonic acid chlorides, organic esters, organic ethers, thioethers, halomethyl compounds, ketones, nitriles, sulphonic acids, amines, polyamines, polyesteramide, amino compounds, aminoplasts, alkyl magnesium chloride, alkenes, alkynes, alkyl halide, organometallic compounds such as methyl magnesium chloride, dialkyl mercury, dialkyl zinc, dialkyl magnesium, alkali metal carboxylic acids and polycarboxylic acids, alkyloxy alkali metals, alkali metal cyanides, alkaline earth metal cyanides, calcium carbide, arylalkenes, organic polyenes, aminophenols, proteins, terpenes, oils, fats, amides, polyamides, imides, polyimides, organic phosphates, organic phosphates, organic phosphonates, organic phosphines and other organic phosphorus containing compounds, carbohydrates, lignins, cellulose, amino acids, arylalkynes, halogenated alkenes, aminoalcohols, organic carbonates, etc. and mixtures thereof.

Any suitable organic compound containing the following radicals and mixtures thereof may be utilized in this invention:

—SH, —CH$_2$Cl, —CH$_2$Br, CH$_2$I, —CN, —NO, —COCl, —COBr, —SO$_2$Cl, —SO$_2$Br, —COOH,

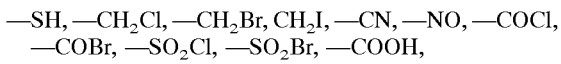

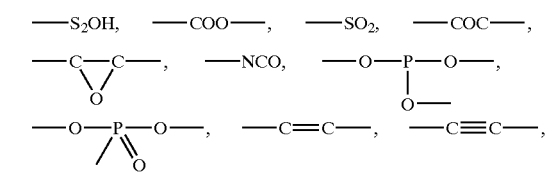

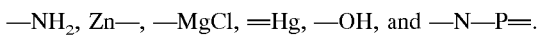

—NH$_2$, Zn—, —MgCl, =Hg, —OH, and —N—P=.

COMPONENT H

An suitable salt forming compound that will react with an organic phosphorus compound or inorganic phosphorus compound may be used in this invention. Suitable salt forming compounds include, but not limited to, compounds containing alkali metals, alkaline earth metals, metals, and nitrogen containing compounds such as compounds containing ammonium radicals, ammonia, amines, amino compounds, urea condensates, biuret, cyanuric acid, cyamelide, partially hydrolyzed urea condensates, polyamines, and aminoplasts, other nitrogen containing compounds and mixtures thereof. Nitrogen containing salt forming compounds such as alkylanolamine compounds are the preferred salt forming compounds, particularly ethanolamine. The basic salt forming compounds may be utilized in the amount of 0 to 100 parts by weight. It is not always necessary to use basic salt forming compounds but when used it is utilized in the amount of 5–100 parts by weight.

COMPONENT D

Any suitable carbonization auxiliaries may be utilized in this invention. Suitable carbonization auxiliaries are compounds that in the presence of fire assist the formation of a carbonization foam or char, such as, additives that produce acidic components in the pyrolysis mixture, such as phosphorus acids, boric acids or sulfuric acids. These acidic components are compounds such, for example, acids or salts, or their derivatives of sulfur, boron and phosphorus, such as, boron-phosphates, phosphates, and polyphosphates of ammonia, amines, polyamines, amino compounds, thioureas and alkyanolamines, but boric acid and its salts and their derivatives, organic phosphorus compounds and their salts, halogenated organic phosphorus compounds, their salts and their derivatives may also be used for this purpose.

Phosphorus containing compounds, such as, boron-phosphates, phosphates, and polyphosphates of ammonia, amines, polyamines, amino compounds, thioureas and alkyanolamines, boric acid and its salts and their derivatives, organic phosphorus compounds and their salts, halogenated organic phosphorus compounds, their salts and their derivatives may also be used for this purpose. The carbonization auxiliaries and other flame retardant agents may be used in quantities of 0 to 100 parts by weight. In many compositions they are not necessary but when used, it is used in the amount of 5 to 100 parts by weight.

The nitrogen containing salts of phosphorus acids are the preferred carbonization compounds, such as amine phosphates, amine salts of organic phosphorus compounds, amino phosphate, amino salts of organic phosphorus compounds and amino condensation salt of inorganic and organic phosphorus compounds. The amino condensation salt of phosphorus compounds are produced by contacting the amino condensation compounds with phosphorus containing compound that will react with an amino compound, under conditions sufficient to prepare an amino condensation salt of a phosphorus containing compound. Suitable inorganic phosphorus compounds include, but not limited to phosphoric acid, pyrophosphoric acid, triphosphoric acid, metaphosphoric acid, phosphorous acid, hypophosphorous acid, phosphinic acid, phosphinous acid, phosphine oxide, phosphorus trihalides, phosphorus oxyhalides, phosphorus oxide, mono-metal hydrogen phosphates, ammonia dihydrogen phosphate, bromated phosphates, alkaline metal dihydrogen phosphate and halogenated phosphate-phosphite and their halides and acids. Organic phosphorus compounds include, but not limited to, alkyl, cyclic, sty] and alkyl-aryl phosphorus compounds, such as, alkylchlorophosphines, alkyl phosphines, alkyl phosphates, dialkyl hydrogen phosphates, dialkyl alkyl phosphonates, trialkyl phosphates, organic acid phosphates, organic phosphonate esters, aryl phosphates, aryl hydrogen phosphates, halogenated phosphonates esters and mixtures thereof, Amino condensation borates may be produced by contacting boric acid and amino condensation compound under conditions sufficient to prepare the amino condensation berates which may also be utilized and also ammonia borates may be used. Amino condensation boron-phosphates may be produced by contacting boron-phosphates and amino condensation compounds under conditions sufficient to prepare amino condensation boron-phosphate compounds which may also be utilized. The salt forming phosphorus containing compounds will react with the amino condensation compounds to form an amino condensation salt of a phosphorus containing compound which may also be used. The carbonization auxiliaries are utilized in the amount of 0 to 100 parts by weight. It is not always necessary to utilize carbonization auxiliaries but when they are used they are utilized in the amount of 5 to 100 parts by weight.

COMPONENT G

Any suitable filler may be used in this invention. The fillers that may be utilized in the flame retardant mixture are usually insoluble in the reaction mixtures. They may be inorganic substances, such as, alkali metal silicates, alkaline earth metal silicates, metal silicates, glass beads or hollow beads. Hydrated aluminum oxide is the preferred inorganic compound. They may be organic substances such as urea, melamine, dicyandiamide, and other cyanuric derivatives or their formaldehyde resins, aminophosphates, amino salts or organic phosphates, phenol-aldehyde resin powder, powdered coke, graphite, graphite compounds, lignins, cellulose and mixtures thereof The organic halide flame retardant compounds may also be added as fillers. Fillers may be used in the amount of 0 to 200 parts by weight. Fillers are not always necessary but when used are used in the amount of 5 to 200 parts by weight.

COMPONENT I

Any suitable organic material which is more flammable than the organic phosphorus-phosphorus oxyacids or salt of organic phosphorus-phosphorus oxyacid compounds of this invention may be used in this invention, Any suitable plastic resin composition or mixtures thereof and any suitable natural organic material may be used in this invention and mixtures thereof. These materials may be in the form of a solid, cellular, suspension, emulsion or solution. Suitable plastic resin include, but not limited to, vinyl dienes, vinyl diene copolymers, polyesters, polyester resins, phenoplasts, aminoplasts, polyepoxy resins, polyurethanes, furans, polyamides, polyimides, polycabonates, silicones, polyethers, thioplasts, polytetrafluoroethlylene, polysulfones, urethane-epoxy resins, urethane silicate resins or foams, cellulose nitrates, regenerated cellulose, cellulose esters, cellulose ethers, cyanoethyl cellulose, lignin-phenol-formaldehyde, lignin-amino-formaldehyde and mixtures thereof.

Suitable natural products include, but not limited to, wood, cellulose, lignin-cellulose, lignins, paper, cotton, wool, linen, dammars, copols, other natural resins, natural rubber, natural proteins, e.g., soya bean protein, silk glues gelatin, etc., modified cellulose and mixtures thereof.

Any suitable isocyanate may be used in this invention, organic polyisocyanates are preferred. The commercially available ones are preferred such as tolylene-2,4-diisocyanate, tolylene-2,6-diisocyanate, polymethylene polyphenyl isocyanate, diphenymethane-4,4'-diisocyanate, 3-methlydiphenyl-methane-4,4'-diisocyanate, m- and p-phenylenediisocyanante, polyphenylmethylene isocyanates obtained by phosgenation, commercially known as "crude MDI", modified polyisacyanates and mixtures thereof. Suitable organic polyisocyanate are exemplified by the organic diisocyanates which are compounds of the general formula:

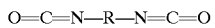

wherein R is a divalent organic radical such as an alkylene, aralkylene or arylene radicals, such radicals may contain 2 to 20 carbon atoms. Any suitable compound with active hydrogens may be reacted with the polyisocyanates to produce polyurethane products, The preferred compound with active hydrogens are polyols. Polyurethane, catalyst, blowing agents, surfactants, foam stabilizers and fillers may also be used. Any suitable polyepoxy compounds may be used in this invention such as allyl glycidyl ether, tert-butyl glycidyl ether and other polyepoxides.

COMPONENT (1)

Any suitable thermoplastic resin may be used in this invention. Suitable thermoplastic resins include the olefin polymers. The olefin polymers include, for example, homopolymers and copolymers of olefins such as ethylene, propylene, butene-1, pentene-1, hexene-1, heptene-1, octene-1, octene-1 and the like, and specific samples thereof include polyethylene, polypropylene, ethylene-polypropylene copolymers, ethylene-butene-1 copolymer, ethylene-hexene-1 copolymers, and ethylene-octene-1 copolymers.

Said olefin polymers also include copolymers of said olefin with polar monomers comprising the olefin unit as the main constituent, specifically ethylene-vinyl acetate copolymer, ethylene-methylmethacrylate copolymer, ethylene-acrylic acid copolymer, ethylene-vinyl alcohol copolymer and the like. These olefin polymers may be used alone or in combination of two or more. The thermoplastic resin in this invention includes homopolymers and copolymers of unsaturated carboxylic acids and their alkyl esters such as acrylic acid, methacrylic acid, methylacrylate, methylmethacrylate, and the like and vinyl esters of saturated carboxylic acids such as vinyl acetate, vinyl butrate and the like. These homopolymers and copolymers may be used alone or in combination of two or more.

Said vinyl aromatic polymers include, for example, homopolymer and coploymers of styrene monomers such as styrene, a-methylstyrene and vinyl styrene, and specific examples thereof polystyrene, poly-a-methylstyrenes, polyvinyltoluene, styrene-a-methylstyrene copolymers and the like. The vinyl aromatic polymers further include, for example, copolymers of styrene with acrylonitrile monomer, maleimide monomer, acrylic acid ester monomer, maleic acid monomer, and specific examples thereof include styrene-acrylonitrile copolymer, styrene-butadiene-acrylonitrile copolymer, styrene-methylacrylate copolymer, styrene-maleic anhydride copolymer and the like. Said vinyl aromatic polymers may also be modified with a rubbery polymer, and the rubbery polymer includes, for example, polybutadiene, styrene-butadiene copolymer, butadiene-acrylonitrile copolymer, ethylene-propylene-diene copolymer, butadiene-acrylic acid ester copolymer and the like. These vinyl aromatic polymers may be used alone or in combination of two or more.

Furthermore, the thermoplastic resin in this invention includes also engineering plastics such as polyphenylene ether, rubber-modified polyphenylene ether, polyethylene terephthalate, polybutylene terephthalate, polyamide, polycarbonate, polyacetal, polysulfone, polyethersulfone, polyphenyene sulfide, polyarylate, polyamide-imide, polyetheramide, polyetherketone, polyetheretherketone, polyimide and the like. The thermoplastic resins in this invention may also be chemically modified products, blends and alloyed products of the above-mentioned thermoplastic resins or may be reinforced with glass fiber or the like.

As the thermoplastic resin to be used in this invention, among the above-mentioned examples, particularly preferable in industry are those consisting of one or more olefin polymers mentioned above or those consisting of one or more vinyl aromatic polymers in view of the moldability and mechanical properties of a flame retardant resin composition prepared by mixing the thermoplastic resin with an organic phosphorus-inorganic phosphorus oxyacid compound or composition, composition and/or a salt of an organic phosphorus-phosphorus oxyacid compound, a comb-like polymer, a metal-containing compound having a carbonization accelerating effect, component, a carbonization auxiliary, and a filler.

When halogen-containing resins, for example, polyvinyl chloride, polyvinyldiene chloride, chlorinated polyethylene, chlorosulfonated polyethylene and the like, are used as polymer of this invention, the flame retardant can be improved, but the halogen-containing resins become a source of generating a toxic gas due to the halogen element contained therein when the resins are burned, and hence, are not the optimum resins to be used in this invention. The thermoplastic resins may be utilized in the amount of 100–200 parts by weight.

COMPONENT (2)

Component (2), a organic phosphorus-phosphorus oxyacid compounds which are produced by reaction component A, a phosphorus halogen compound containing phosphorus which has a valence of 3, and component B, an inorganic phosphorus oxyacid compound containing phosphorus which has a valence of 5 and an organic compound that will react with a phosphorus halide and/or a phosphorus oxyacid compound. The organic phosphorus-phosphorus oxyacid compounds maybe utilized in the amount of 5 to 50 parts by weight.

COMPONENT (3)

Component (3), salt of organic phosphorus-phosphorus oxyacid compounds are produced by the process of this invention as stated above, by reacting component A, a phosphorus halide compound, component B, an inorganic phosphorus oxyacid compound and an component C, an organic compound, thereby producing an organic phosphorus-inorganic phosphorus oxyacid compound which is then reacted with component C, a salt forming compound. The preferred salt of an organic phosphorus-phosphorus oxyacid compounds to be use to flame retard thermoplastic resins are nitrogen containing salts of organic phosphorus-inorganic phosphorus oxyacid compounds. The preferred nitrogen containing compound are amino compounds such as urea, urea condensates, melamine or a combination of melamine and another amino compound and/or ammonia compound. The preferred organic phosphorus compounds are organic phosphonate compounds, for example, dimethyl methyl phosphonate. The salts of organic phosphorus-phosphorus oxyacids may be utilized in the amount of 5 to 50 parts by weight.

COMPONENT (4)

A comb like polymer consisting of a polyethyene main chain and a polyoxyalkylene main chain and a polyoxyalkylene side chain can be obtained by, for example, graft-copolymerization of a cyclic ether such as ethylene oxide or propylene oxide unto a saponification product of an ethylene-vinyl acetate copolymer, esterification between ethylene-vinyl acid copolymer and polyethylene glycol, poly-propylene glycol or the like, copolymerization of ethylene with w-hydroxypoylethylene oxide macromonomer, or the like. The production process of a comb like polymer comprising heating an ethylene-vinyl acetate copolymer and an alcohol in the presence of an alkali catalyst to saponify them, removing the alcohol and then introducing alkylene oxide there into to form a graft copolymer.

COMPONENT (5)

A metal-containing compound having carbonization accelerating effect used in this invention increases the amount of carbonization residue after combustion, thereby enhancing the flame retarding effect. These compounds include, but not limited to, alkaline earth metal borates such as magnesium borate, calcium magnesium borate and the like, manganese borate, zinc borate, metal oxides of titanium oxide, tin oxide, nickel oxide, zinc oxide and the like, ferrocene, dimethylglyoxime copper, acetylacetonatocopper, hydroxyquinoline nickel and the like, zinc thiocarbamate compounds such as zinc dimethylthiocarbamate, zinc di-n-butyldithiocarbamate and the like, mercaptobenzothiazole zinc compounds such as mercaptobenzothiazole zinc and the like, salicyladehyde zinc compounds such as salicylaldehyde zinc compounds such as salicylaldehyde zinc and the like, metal hydroxides such as aluminum hydroxide, magnesium hydroxide, calcium magnesium hydroxide, zirconium hydroxide and the like.

The most preferable compounds are selected from zinc oxide, the zinc thiocarbamate compounds, the mercaptobenzothiazole zinc compounds, the salicyaldehyde zinc compounds, zinc borate and the alkaline earth metal borates.

DETAIL DESCRIPTION OF THE INVENTION

The components are mixed and reacted under conditions sufficient to prepare the organic phosphorus-phosphorus oxyacid compounds and/or composition and flame retarded organic materials. Many of the reactions will take place at ambient temperature and pressure. Most of the reactions are exothermic and may require cooling. Chlorine and HCl is given off in the reaction. Some of the reactions may be speeded up by using an elevated temperature of 100° to 300° C. and increased pressure. When a gas is used it may be necessary to use increased pressure to compress the gas in order to form a liquid.

It is preferred for the phosphorus halide compound to contain a phosphorus atom which has a valence of 3–4 so that the phosphorus atom will have 1 or 2 remaining valences to react with the inorganic phosphorus oxyacid compound which contain a phosphorus atom which has a valence of 5. The inorganic phosphorus oxyacid had active hydrogens to react with the 1 to 4 free valences of the organic phosphorus compound produced by the reaction of the phosphorus halide with the organic compound. The organic phosphorus compounds with a coordination number of four ("pentavalent" phosphorus compounds) will also react with inorganic phosphorus oxyacid compounds. The organic phosphates has an active oxygen on the phosphorus atom which will react with the inorganic phosphorus oxyacid compounds. The organic phosphorus-phosphorus oxyacid compounds may be produced as a neutral, mildly acidic or moderate acidic compounds.

The salt of organic phosphorus-phosphorus oxyacid compounds are usually produced by mixing and reacting the phosphorus halide with a phosphorus oxyacid and an organic compound to produce an organic phosphorus-phosphorus oxyacid compound and then the salt forming compound is added and reacted thereby producing a salt of organic phosphorus-phosphorus oxyacid compound. These reactions are usually exothermic, but in some reactions it is necessary to heat the mixture up to 300° C. Then the comb-like polymer, carbonization auxiliaries, carbonization accelerating compound and fillers are added and mixed with the salt of organic phosphorus-phosphorus oxyacid compound to form a flame retardant composition. The flame retardant salt of organic phosphorus-phosphorus oxyacid compound and/or the flame retardant composition is added on or mixed in the more flammable organic material.

In this invention, the method of mixing the thermoplastic resin, the organic phosphorus-phosphorus oxyacid compound, salt of organic phosphorus-phosphorus oxyacid compound and/or composition, comb-like polymer consisting of a polyethylene main chain and a polyoxyalkylene side chain and a metal-containing compound having a carbonization accelerating effect is not critical. All the above components, thermoplastic resin, organic phosphorus-phosphorus oxyacid compound and/or composition and/or salt of organic inorganic phosphorus-phosphorus oxyacid and/or composition, comb-like polymer, carbonization auxiliaries and metal containing compound may be added simultaneously then mixed together by any suitable means. They may be mixed together by using a Banbury mixer, an open roller, a kneader, a single or multiple screw extruder or the like with or without or after mixing by a Henschel mixer, a tumbler mixer or the like. The said mixture is heated until the thermoplastic resin softens or melts then is thoroughly mixed then extruded or molded into a desired shape. The organic phosphorus-phosphorus oxyacid compound and basic salt forming compound may be added separate with the thermoplastic resin, and are reacted when the mixture is heated.

The flame retardant thermoplastic composition of this invention may if necessary, have added thereto a heat stabilizer, an antioxidant, a light stabilizer, a lubricant, an antifogging agent, a pigment, a blowing agent, a fluorescent agent, a release agent, a processing aid, a reinforcing agent, and the like which are generally added to a thermoplastic resin, depending upon the uses of the composition. A known flame-retardant such as a halogen-containing flame retardant, an inorganic flame retardant or the like may also be added to the thermoplastic resin.

DESCRIPTION OF THE PREFERRED EMBODIMENT

The following examples which describe certain preferred embodiment of the processes may, of course, be varied as described above with similar results. This invention is not limited to the examples below. Parts and percentages are by weight unless otherwise indicated.

The following Reference Examples shows method for producing the organic phosphorus-phosphorus oxyacid compounds and composition, basic salt of organic phosphorus-phosphorus oxyacid compounds and compositions, and the comb-like polymer consisting of a polyethylene main chain and a polyoxyalkylene side chain.

REFERENCE EXAMPLES

Example 1

20 parts by weight of phosphorus trichloride, 20 parts by weight of methyl alcohol and 30 parts by weight of phosphoric acid are slowly added and mixed. The reaction is exothermic and chlorine and some hydrogen chloride are given off. The reaction is completed within 30 minutes to 2 hour thereby producing an organic phosphorus-phosphoric oxyacid compound (dimethyl phosphorus-phosphorus oxyacid. The chemical reaction maybe enhanced by keeping the temperature of the mixture just below the boiling point of the reactants.

Example 2

25 parts by weight of ethyl alcohol and 25 parts by weight of phosphorus trichloride are slowly added, mixed and reacted, chlorine and some hydrogen chloride are given off, thereby producing an organic phosphorus compound. Then 25 parts by weight of phosphoric acid are mixed and reacted. The reaction is exothermic and is completed within 30 minutes to 1 hour, thereby producing an organic phosphorus-phosphoric oxyacid compound. The chemical reaction may be speeded up by keeping the temperature of the mixture just below the boiling point of the reactants.

Example 3

10 parts by weight of phosphorus oxytrichloride, 10 parts by weight of ethyl glycol and 10 parts by weight phosphoric acid are slowly mixed and reacted. Chlorine and some hydrogen chloride is given off. The reaction is exothermic and the temperature of the reactants are keep below their boiling point for 30 minutes to 1 hour thereby producing an organic phosphorus-phosphoric oxyacid compound.

Example 4

Example 1 is modified where 30 parts by weight of phosphoric acid is used instead of 25 parts by weight.

Example 5

Example 1 is modified wherein 20 parts by weight of phosphoric acid is used instead of 25 parts by weight.

Example 6

Example 1 is modified wherein another phosphorus halide compound is used in place of phosphorus trichloride thereby producing an organic phosphorus-phosphorus oxyacid compound and selected from the list below:

| | |
|---|---|
| a) phosphorus tribromide | b) phosphorus triflouride |
| c) phosphorus triiodide | d) phosphorus pentachloride |
| e) phosphorus pentabromide | f) phosphorus pentaflouride |
| g) phosphorus thiotrichloride | h) phosphorus oxytrichloride |
| i) phosphorus oxytribromide | j) phosphorus oxytriiodide |
| k) phosphorus oxyflouride | |

Example 7

Example 1 is modified wherein another organic compound is used in place of the methyl alcohol thereby producing an organic phosphorus-phosphorus oxyacid compound and selected from the list below:

| | |
|---|---|
| a) ethyl alcohol | b) propyl alcohol |
| c) butyl alcohol | d) ethylene glycol |
| e) propylene glycol | f) butylene glycol |
| g) lignin | h) glycerol |
| i) propylene oxide | j) butylene oxide |
| k) epichlorohydrin | l) chlorohydrin |
| m) ethanolamine | n) propyl amine |
| o) methylamine | p) urea |
| q) phenol | r) acetic acid |
| s) acetonitrile | t) adipic anhydride |
| u) acetaldehyde | v) aniline |
| w) ethylenediamine | x) sucrose |
| y) hexamethylene diisocyanate | o) and mixtures of the above. |

Example 8

Example 2 is modified wherein another organic compound is used in place of the ethyl alcohol thereby producing an organic phosphorus-phosphorus oxyacid compound and selected from the list below:

| | |
|---|---|
| a) methyl alcohol | b) proponic acid |
| c) ethyl carbamate | d) cresol |
| e) glucose | f) succinic acid |
| g) cellulose | h) phthalic acid |
| i) caster oil | j) glycolic acid |
| k) glycerol | l) furfuryl alcohol |
| m) furfural | n) propylene oxide |
| o) isopropyl alcohol | p) propionamide |
| q) acetic anhydride | r) ethyl acetate |
| s) polyester resin with free —OH radicals | t) polyamide with free —NH radicals |
| u) acrylic acid | v) allyl alcohol |
| w) trimethylene glycol | x) butyric acid |
| y) acetone clyanohydrin | z) and mixtures of the above. |

Example 9

Example 1 is modified wherein an inorganic phosphorus oxyacid compound is used in place of phosphoric acid and selected from the list below,

| | |
|---|---|
| a) polyphosphoric acid | b) pyrophosphoric acid |
| c) triphosphorus acid | d) metaphosphoric acid |
| e) phosphorus acid | f) hypophosphorus acid |
| g) phosphinic acid | h) phosphinous acid |
| i) phosphine oxide | j) phosphorus oxide |
| k) mono-aluminum phosphate | l) ammonium hydrogen phosphate |
| m) ammonium polyphosphate | p) boron hydrogen phosphate |
| q) boron polyphosphate | r) phosphorus trioxide |
| s) phosphorus pentaoxide | t) and mixtures of the above. |

Example 10

Example 1 is modified wherein the organic phosphorus-phosphorus oxyacid compounds is reacted to produce a basic salt of organic phosphorus-phosphorus oxyacid and the basic salt is selected from the list below:

| | |
|---|---|
| a) urea | b) thiourea |
| c) ammonia | d) methyl urea |
| e) ammonium carbonate | f) ammonium bicarbonate |
| g) dicyandiamide | h) guanidine |
| i) aminoguanidine | j) methyl amine |
| k) propylene diamine | l) diethylenetriamine |
| m) aluminum hydroxide | n) magnesium hydroxide |
| o) boric oxide | p) ammonium borate |
| q) urea borate | r) biuret |
| s) isocyanuric acid | t) hydrolyzed biuret |
| u) urea condensate | v) urea melamine condensate |
| w) aniline | x) ethanolamine |
| y) diethanolamine | z) and mixture of the above. |

Example 11

25 gms of phosphoric acid and 25 gms of phosphorus oxytrihalide are mixed and reacted then 15 gms of ethyl alcohol are added and reacted at ambient temperature and pressure for 30 minutes thereby producing an organic phosphorus-phosphorus oxyacid compound $Cl_2$ and HCl evolves from the mixture.

Example 12

25 parts by weight of phosphorus oxytrichloride, 25 parts by weight of phenol and 25 parts by weight of phosphoric acid are mixed and keep at a temperature just below the boiling point of the reactants for one hour, chlorine and some HCl evolves from the mixture, thereby producing an organic phosphorus-phosphorus oxyacid compound.

Example 13

Example 12 is modified wherein another phosphorus halide is used in place of phosphorus oxytrichloride and selected from the list below:

| | |
|---|---|
| a) phosphorus trichloride | b) phosphorus tribromide |
| c) phosphorus oxytribromide | d) phosphorus triflouride |

Example 14

Example 12 is modified wherein another inorganic phosphorus oxyacid is used in place of phosphoric acid and selected from the list below:

| | |
|---|---|
| a) pyrophosphoric acid | b) triphosphoric acid |
| c) polyphosphoric acid | d) phosphinic acid |
| e) phosphorus acid | f) phosphinous acid |
| g) phosphine oxide | h) phosphorus oxide |
| i) ammonium phosphate | j) mono-aluminum phosphate |
| k) mono-magnesium phosphate | l) boron polyphosphate condensation |
| p) and mixtures thereof | |

Example 15

Example 12 is modified wherein a salt forming nitrogen containing compound is reacted with the organic phosphorus-phosphorus oxyacid compound at ambient temperature or elevated temperature and selected from the list below:

| | |
|---|---|
| a) urea | b) thiourea |
| c) methyl urea | d) biuret |
| e) hydrolyzed biuret | f) isocyanuric acid |
| g) hydrolyzed isocyanuric acid | h) dicyandimide |
| i) dimelamine phosphate | j) melamine borate |
| k) guanidine | l) aminoguanidine |
| m) ammonium carbonate | n) guanidine carbonate |
| o) melamine borate | p) ethylene diamine |
| q) diethylenetriamine | r) ammonia |
| s) ethyl isocyanate | t) acetoamide |
| u) urea melamine condensate | v) hydrolyzed urea melamine condensation |
| w) ethanolamine | x) diethanolamine |
| y) linoleic acid | z) and mixtures of the above |

Example 16

100 parts by weight of unsaturated polyester resin, 0.5 part by weight of organic peroxide and 15 parts by weight the dimethyl phosphorus-phosphoric acid compound produced in Example 1 are mixed then poured into a mold to produce a ⅛"×6"×6" sample. The sample is cured for one week then cut in l/2" wide strips. These strips are tested by placing the strips in a vertical position then applying a 2" Bunsen flame under the strip with the flame hitting the strip. The flame is applied for 10 seconds and if not burning it is applied for another 10 seconds. The strip did not catch on fire after the flame was applied for 20 seconds.

Example 17

Example 16 was modified wherein 300 parts by weight of Portland cement containing 15%–25% water was added to the unsaturated polyester resin thereby producing a flame retardant polyester concrete. The sample was tested as in Example 16 and did not catch on fire.

Example 18

50 parts by weight of polymeric MDI (Mondur MR by Mobay), 50 parts by weight of sucrose polyol , (Olin No. 475), containing 1% foam regulator (L5420 by Union Carbide), 025 part by weight of a tin polyurethane catalyst (TI2 by Air Products), an amine catalyst (Polycat R 8020 by Air Products) and 4 parts by weight of water, and 20 parts by weight of the organic phosphorus-phosphoric acid compound produced in Example 2 are mixed then poured in t o a mold. The mixture foams into a rigid flame retarded polyurethane foam of about 2 lbs. per cubic foot. The foam is cured for 1 week then flame tested using a ½"×2"×5" sample which is placed vertically on a frame, then a Bunsen burner with a 2" high flame is placed under the foam sample. The flame applied for 20 seconds as in UL 94 VO. The flame went out as soon as the Bunsen burner was removed. The melted plastic did not burn.

Example 19

15 parts by weight of biuret salt of organic phosphorus-phosphorus oxyacid compound of Example 15d, 15 parts by weight of a polyol component with urethane catalyst (Pro-Design B by 3M), and 30 parts by weight of MDI prepolymer Pro-Design A by 3M) are mixed and poured into a molds thereby forming solid flame retardant polyurethane samples, ⅛"×2"×6". These samples were cured for 1 week then flame tested using a 4" Bunsen burner flame which was placed at the bottom of a vertical sample for 1 minute. The flame went out as soon as the Bunsen burner was removed. There was about a 2% weight loss.

Example 20

100 parts by weight of ethylene modified polypropylene glycol (MULTRANOL 7056 by Miles), 30 parts by weight of ethanolamine salt of the organic phosphorus-phosphoric acid compound of Example12w, 1 part by weight of silicone surfactant (L6202 by Union Carbide), 3 parts by weight of water, 0,5 weight of amine catalyst (polycat 33L by Air Products), 0.025 parts by weight of tin catalyst (TI 2 by Air Products) and 50 parts by weight of TDI (MONDUR TD80) are mixed then poured into a mold thereby producing a flame retardant flexible polyurethane foam. The foam was cured for I week then flame tested by using ½"×2"×6" samples hung vertically. A 2" Bunsen burner flame was placed under the foam for 1 minute. The flames did not spread and the melted drippings did not burn. The flexible foam was also flame tested by the method of Calif. TB 133 test and it passed the test because there was only a weight loss of 52 gms.

Example 21

Example 21 is modified wherein another polyisocyanate is used in place of TDI and selected from the list below:
  a) polymeric MDI (MONDUR MR by Miles)
  b) polymeric MDI (PAPI 27 Dow)
  c) Polymeric MDI (MONDUR MRS)
  d) MDI

Example 22

10 parts by weight of the diethyl phosphorus-phosphoric acid compound of Example 2, 70 parts by weight of a flexible polyepoxy resin (EPON R 828 by Shell) and 18 parts by weight of diamine (Ancamine by Air Products) are mixed then poured into a ⅛"×6"×6" mold and cured, After I week the sample is cut into ½" strips then flame tested by using a Bunsen burner with a 2" flame. The strips were hung vertically then the 2" Bunsen burner flame was placed at the bottom of the strip for 1 minute. After the flame was removed the flame went out. There was about a 2% weight loss.

Example 23

30 parts by weight of polyethylene pellets and 5 parts by weight of biuret salt of the organic phosphorus-phosphoric acid compound produced by the process of Example 15d, are mixed then heated until the polyethylene is capable of being melt-kneaded, usually in the range of 200'–300' C. The mixture is melt-kneaded until the flame retardant is thoroughly mix in the plastic, The plastic is then pressed into mold to obtain a sample of 1/16 to ⅛ thick. The sample is cut into ½" strips and flame tested by the method of UL 94 VO. The samples were placed vertically then a 2" Bunsen burner flame was placed at a 20 degree angle under the sample for two periods of 10 seconds. When the flame was removed the flame went out and the drippings did not catch on fire, The samples had good physical properties.

Example 24

Example 23 was modified wherein another thermoplastic resin was used in place of polyethylene and selected from the list below and flame tested as in Example 22 with the same results:

| | | |
|---|---|---|
| a) polypropylene | b) polyvinyl acetate | |
| c) polystyrene | d) polyamide (nylon) | |
| a) ethylene-vinyl acetate copolymer | f) ethylene-propylene copolymer | |
| g) polyester resin | h) ethylene-acrylic copolymer | |
| i) ethylene-vinyl acetate copolymer | j) ethylene-vinyl alcohol copolymer | |
| k) adipic acid-vinyl acetate copolymer | l) polyvinyl toluene | |
| m) styrene-acrylonitrile copolymer | n) styrene-butadiene copolymer | |
| o) polybutadiene | p) styrene-methyl methacrylate copolymer | |
| q) acrylonitrile-butadiene-styrene copolymer | r) polycarbonate | |
| s) polysulfone | t) polyphenyl ether | |
| u) polybutylene terephthalate | v) ethylene-propylene copolymer | |
| w) polymethyl methacrylate | x) polyvinyl chloride | |
| y) styrene-maleic anhydride copolymer | z) and mixtures of the above. | |

Example 25

Example 23 is modified wherein another organic phosphorus-phosphorus oxyacid compounds or it's salt is used in place of biuret salt of the phosphorus-phosphoric acid and selected from the examples list below:

| | | |
|---|---|---|
| a) 1a | b) 1b | c) 1e |
| d) 1g | e) 1k | f) 1q |
| g) 1h | h) 1r | i) 2c |
| j) 2d | k) 2e | l) 2h |
| m) 2l | n) 2s | o) 2v |
| p) 9a | q) 9b | r) 9c |
| s) 9g | t) 9h | u) 9i |
| v) 9s | w) 10a | x) 10j |
| y) 13a | z) and mixtures of the above | |

Example 26

Examples 23, 24 and 25 are modified wherein carbonization auxiliaries are added in the amount of 3 parts by weight, and selected from the list below.

| | |
|---|---|
| a) ammonium polyphosphate | b) melamine polyphosphate |
| c) melamine borate | d) melamine phosphate |
| a) dimelamine phosphate | f) urea phosphate |
| g) urea polyphosphate | h) boron polyphosphate condensation |
| i) urea-melamine phosphate | j) dicyandiamide phosphate |
| k) dimethyl hydrogen phosphate | l) hydrolyzed buiret phosphate |
| m) biuret phosphate | n) guanidine phosphate |
| o) sulfamic acid | p) ammonium sulfate |
| q) ethylamine phosphate | r) boric oxide |
| s) methyl carbamate phosphate | t) cyanoguanidine phosphate |
| u) phosphorus oxide | v) diethylenetriamine phosphate |
| w) urea-melamine phosphate | x) hydrolyzed urea phosphate |
| y) isocyanuric phosphate | z) and mixtures of the above. |

Example 27

Examples 23,24 and are modified wherein 1 part by weight of a metal-containing compound having a carbonization accelerating effect compound is added with the components and selected from the list below:

| | |
|---|---|
| a) zinc borate | b) zinc oxide |
| c) zinc thiocarbamate | d) calcium borate |
| a) ferricene | f) aluminum hydroxide |
| g) magnesium hydroxide | h) salicylaldehyde zinc |
| i) calcium magnesium hydroxide | j) titanium oxide |
| k) manganese borate | l) tin oxide |
| m) nickel oxide | n) mercaptobenzothiazole zinc |
| o) and mixtures of the above. | |

Example 28

Examples 23, 24 and 25 are modified wherein 1 part by weight of a comb-like polymer comprising the polyethylene main chain and polyoxyalkylene side chain is added to the components.

Example 29

10 parts by weight of the organic phosphorus-phosphoric oxyacid compound produced in example 15h, which is then mixture with 100 parts by weight of polyethylene pellets, then heated to the melting point of the polyethylene. The components are melt-kneaded until they are thoroughly mixed then pressed into a mold producing samples of 1/16" to ⅛" thick. The samples are cut into ½" strip then flame tested. They are hung in a vertical position, then a 2" Bunsen burner is placed under the samples with the flame hitting the samples. The flame is left on the bottom of the samples for 10 seconds, then another 10 seconds. The samples did not burn after the flame was removed. The melted plastic did not catch on fire.

Example 30

20 parts by weight of diethyl phosphorus-phosphoric oxyacid compound produced in example 2. and 200 parts by weight of polypropylene pellets are mixed the heated to about 200° to 250° C. The component are melt-kneaded until they are thoroughly mixed, then pressed into a mold producing samples of ⅙" to ⅛" thick. The samples are cut into ½" strips then flame tested while in a vertical position. A 2" Bunsen burner flame is placed on the bottom of the sample for two 10 seconds periods. The samples did not catch on fire. The melted drippings did not catch on fire.

Example 31

Example 30 is modified wherein 5 parts by weight of melamine is added and reacted with the diethyl phosphorus-phosphoric oxyacid, then cooled and pulverized into a powder, then added to the polypropylene pellets.

Example 32

Example 30 is modified wherein 3 parts by weight of zinc borate, 5 parts by weight of ammonium polyphosphate and 3 parts by weight of a comb-like polymer consisting of a polyethylene main chain and a polyoxyalkylene side chain are added to the polyproplene pellets.

Example 33

Example 30 is modified wherein another thermoplastic resin is used in place of polypropylene and selected from the list below:

| | |
|---|---|
| a) polyethylene | b) nylon (polyamide) |
| c) polyvinyl acetate | d) ethylene-vinyl acetate copolymer |
| a) polyester resin | f) polyvinylidene chloride |
| g) polyurethane resin | h) polyurethane-epoxy resin |
| l) polystyrene | j) polymethylstyrene |
| k) styrene-acrylonitrile copolymer | l) polymethacrylate |
| m) polycarbonate | n) polyestersulfone |
| o) butadiene acrylonitrile copolymer | p) polyethylene terephthalate |
| q) butylene terrephthalate resin | r) styrene-maleic anhydride copolymer |
| s) polyacetal resin | t) ethylene-propylene-vinyl acetate copolymer |
| u) silicone resin | v) acrylic acid-methacrylic copolymer |
| w) polybutylene | x) phenol-aldehyde resin |
| y) polyimide | z) and mixtures of the above |

Example 34

20 parts by weight of dimethyl phosphorus-phosphoric acid of Example 1 and 100 parts by weight of styrene monomer containing a free-radical catalyst system are mixed, and reacted thereby producing a flame retardant polystyrene resin. The flame retardant polystyrene resin was molded into ⅙" to ⅛" samples then cut into ½" strips. These strips were placed vertically in a holder, then flame tested with a 2" Bunsen burner for two 10 seconds periods, and the samples did not catch on fire.

Example 35

Example 33 is modified wherein another vinyl monomer is used in place of styrene monomer and selected from the list below:

| | |
|---|---|
| a) acrylonitrile | b) acrylic acid |
| c) methacrylic acid | d) methyl methacrylate |
| e) methacrylate | f) and mixtures thereof. |

I claim:
1. A flame retardant composition comprising a flammable organic material selected from the group consisting of plastic resins, natural products and mixtures thereof having incorporated in or on a flame retardant amount of:
A) an organic phosphorus-phosphorus oxyacid compound and composition produced by mixing and/or mixing and heating, and reacting the following components in stoichiometric proportions:
a) phosphorus compound containing halides selected from the group consisting of phosphorus trichloride, phosphorus oxytrichloride, phosphorus pentachloride and mixtures thereof, in the amount of 25 to 100 parts by weight;
b) inorganic phosphorus oxyacid, selected from the group consisting of phosphoric acid, polyphosphoric acid, pyrophosphoric acid, triphosphoric acid, phosphinic acid, metaphosphoric acid, hypophosphorus acid, phosphonous acid, and mixtures in the amount of 10 to 100 parts by weight;
c) organic compounds that will react with a phosphorus compound containing halides or a phosphorus oxyacid, and are a saturated or unsaturated aliphatic, aromatic, cyclic, aliphatic-aromatic or aliphatic-cyclic compound selected from the group consisting of alcohol, polyalcohol, alkyl epoxides, polyepoxides, carboxylic acids and anhydrides, polycarboxylic acids and anhydrides, aldehydes, phenol, cresol, lignin, alkylalcoholamines, oils, fats, polyesters with hydroxyl or carboxylic radicals, carbohydrates, and mixtures thereof in the amount of 10 to 100 parts by weight of said organic compound thereby producing an organic phosphorus-phosphorus oxyacid compound;
d) a metal containing compound having a carbonization accelerating effect, in the amount of 0 to 30 parts by weight;
e) a carbonization auxiliaries, 0 to 100 parts by weight;
f) a filler, in the amount of 0 to 200 parts by weight; thereby producing an organic phosphorus-phosphorus oxyacid composition; the components a–f being 5 to 50% by weight, based on the weight of the flammable organic material.
2. A flame retardant composition comprising a flammable organic material selected from the group consisting of plastic resins, natural products and mixtures thereof having incorporated in or on a flame retardant amount of:
A) an organic phosphorus-phosphorus oxyacid compound and composition produced by mixing and/or mixing and heating, and reacting the following components in stoichiometric proportions:
a) phosphorus compound containing halides selected from the group consisting of phosphorus trichloride, phosphorus oxytrichloride, phosphorus pentachloride and mixtures thereof, in the amount of 25 to 100 parts by weight;
b) inorganic phosphorus oxyacid, selected from the group consisting of phosphoric acid, polyphosphoric acid, pyrophosphoric acid, triphosphoric acid, phosphinic acid, metaphosphoric acid, hypophosphorus acid, phosphonous acid, and mixtures in the amount of 10 to 100 parts by weight;
c) organic compounds that will react with a phosphorus compound containing halides or a phosphorus oxyacid, and are a saturated or unsaturated aliphatic, aromatic, cyclic, aliphatic-aromatic or aliphatic-cyclic compound selected from the group consisting of alcohol, polyalcohol, alkyl epoxides, polyepoxides, carboxylic acids and anhydrides, polycarboxylic acids and anhydrides, aldehydes, phenol, cresol, lignin, alkylalcoholamines, oils, fats, polyesters with hydroxyl or carboxylic radicals, carbohydrates, and mixtures thereof in the amount of 10 to 100 parts by weight of said organic compound thereby producing an organic phosphorus-phosphorus oxyacid compound;

d) a metal containing compound having a carbonization accelerating effect, is selected from the group consisting of zinc oxide, zinc thiocarbamate compounds, mercaptobenzothiazole zinc compounds, mercaptobenzothiazol zinc compounds, salicylaldehyde zinc compounds, zinc borate and alkaline earth metal borates, in the amount of 0 to 30 parts by weight. in the amount of 0 to 30 parts by weight;

e) a carbonization auxiliaries, selected from the group consisting of phosphorus containing compounds, boron containing compounds, boron-phosphate containing compounds and sulfur containing compounds that produce acidic components in the pyrolysis mixture, in the amount of 0 to 100 parts by weight.

f) a filler, selected from the group consisting of urea, melamine, dicyandiamide, melamine cyanurate, amino phosphates, aminoplasts, phenoplasts, ammonium phosphates, powdered synthetic resins, sawdust, lignins, carbohydrates, bituminous additives, graphite, graphite compounds, powdered coke, silica, alkali metal silicates, alkaline earth metal silicates, metals and metal oxides, carbonates, sulphates, phosphates and borates, glass beads, hollow beads, hydrated aluminum oxide and mixtures thereof, in the amount of 0 to 200 parts by weight; thereby producing an organic phosphorus-phosphorus oxyacid composition; the components a–f being 5 to 50% by weight, based on the weight of the flammable organic material.

3. A flame retardant thermoplastic resin composition which comprises:
1) thermoplastic resin, in the amount of 100 to 200 parts by weight;
2) organic phosphorus-phosphorus oxyacid produced by mixing and/or mixing and heating, and reacting the following components in stoichiometric proportions:
   a) phosphorus compound containing halides selected from the group consisting of phosphorus trichloride, phosphorus oxytrichloride, phosphorus pentachloride and mixtures thereof, in the amount of 25 to 100 parts by weight;
   b) inorganic phosphorus oxyacid, selected from the group consisting of phosphoric acid, polyphosphoric acid, pyrophosphoric acid, triphosphoric acid, phosphinic acid, metaphosphoric acid, hypophosphorus acid, phosphonous acid, and mixtures in the amount of 10 to 100 parts by weight;
   c) organic compounds that will react with a phosphorus compound containing halides or a phosphorus oxyacid, and are a saturated or unsaturated aliphatic, aromatic, cyclic, aliphatic-aromatic or aliphatic-cyclic compound selected from the group consisting of alcohol, polyalcohol, alkyl epoxides, polyepoxides, carboxylic acids and anhydrides, polycarboxylic acids and anhydrides, aldehydes, phenol, cresol, lignin, alkylalcoholamines, oils, fats, polyesters with hydroxyl or carboxylic radicals, carbohydrates, and mixtures thereof in the amount of 10 to 100 parts by weight of said organic compound thereby producing an organic phosphorus-phosphorus oxyacid compound, in the amount of 5 to 50 parts by weight;
3) carbonization auxiliaries, in the amount of 0 to 100 parts by weight;
4) metal-containing compound having a carbonization accelerating effect, in the amount of 0 to 30 parts by weight;
5) filler, in the amount of 0 to 200 parts by weight.

4. The flame retardant thermoplastic resin composition of claim 3, wherein the thermoplastic resin is a thermoplastic resin consisting of at least one olefin polymer.

5. A flame retardant thermoplastic resin composition which comprises:
1) thermoplastic resin consisting of at least one vinyl aromatic polymer, in the amount of 100 to 200 parts by weight;
2) organic phosphorus-phosphorus oxyacid produced by mixing and/or mixing and heating, and reacting the following components in stoichiometric proportions:
   a) phosphorus compound containing halides selected from the group consisting of phosphorus trichloride, phosphorus oxytrichloride, phosphorus pentachloride and mixtures thereof, in the amount of 25 to 100 parts by weight;
   b) inorganic phosphorus oxyacid, selected from the group consisting of phosphoric acid, polyphosphoric acid, pyrophosphoric acid, triphosphoric acid, phosphinic acid, metaphosphoric acid, hypophosphorus acid, phosphonous acid, and mixtures in the amount of 10 to 100 parts by weight;
   c) organic compounds that will react with a phosphorus compound containing halides or a phosphorus oxyacid, and are a saturated or unsaturated aliphatic, aromatic, cyclic, aliphatic-aromatic or aliphatic-cyclic compound selected from the group consisting of alcohol polyalcohol, alkyl epoxides, polyepoxides, carboxylic acids and anhydrides, polycarboxylic acids and anhydrides, aldehydes, phenol, cresol, lignin, alkylalcoholamines, oils, fats, polyesters with hydroxyl or carboxylic radicals, carbohydrates, and mixtures thereof in the amount of 10 to 100 parts by weight of said organic compound thereby producing an organic phosphorus-phosphorus oxyacid compound, in the amount of 5 to 50 parts by weight;
3) carbonization auxiliaries, in the amount of 0 to 100 parts by weight;
4) metal-containing compound having a carbonization accelerating effect, in the amount of 0 to 30 parts by weight;
5) filler, in the amount of 0 to 200 parts by weight.

6. A process for producing a flame retardant composition comprising a flammable organic material selected from the group consisting of plastic resins, natural products and mixtures thereof having incorporated in or on a flame retardant amount of:
A) an organic phosphorus-phosphorus oxyacid compound produced by the process consisting of mixing and/or mixing and heating and reacting in stoichiometric proportions the following components:
   a) phosphorus compound containing halides selected from the group consisting of phosphorus trichloride, phosphorus oxytrichloride, phosphorus pentachloride and mixtures thereof in the amount of 25 to 100 parts by weight;

b) inorganic phosphorus oxyacid selected from the group consisting of phosphoric acid, polyphosphoric acid, pyrophosphoric acid, triphosphoric acid, phosphinic acid, metaphosphoric acid, hypophosphorus acid, phosphonous acid and mixtures thereof, in the amount of 10 to 100 parts by weight;

c) organic compounds that will react with a phosphorus compound containing halides or a phosphorus oxyacid, and are a saturated or unsaturated aliphatic, aromatic, cyclic, aliphatic-aromatic or aliphatic-cyclic compound selected from the group consisting of alcohol polyalcohol, alkyl epoxides, polyepoxides, carboxylic acids and anhydrides, polycarboxylic acids and anhydrides, aldehydes, phenol, cresol, lignin, alkylalcoholamines, oils, fats, polyesters with hydroxyl or carboxylic radicals, carbohydrates, and mixtures thereof in the amount of 10 to 100 parts by weight;

d) a metal containing compound having a carbonization accelerating effect, in the amount of 0 to 30 parts by weight;

e) a carbonization auxiliaries, 0 to 100 parts by weight;

f) a filler, in the amount of 0 to 200 parts by weight; the components a–f being 5 to 50% by weight, based on the weight of the flammable organic material.

7. A process for the production of flame retardant thermoplastic composition, which comprises mixing the following components:

1) thermoplastic resin, in the amount of 100 to 200 parts by weight;

2) organic phosphorus-phosphorus oxyacid produced by mixing and/or mixing and heating, and reacting the following components in stoichiometric proportions:
   a) phosphorus compound containing halides selected from the group consisting of phosphorus trichloride, phosphorus oxytrichloride, phosphorus pentachloride and mixtures thereof, in the amount of 25 to 100 parts by weight;
   b) inorganic phosphorus oxyacid, selected from the group consisting of phosphoric acid, polyphosphoric acid, pyrophosphoric acid, triphosphoric acid, phosphinic acid, metaphosphoric acid, hypophosphorus acid, phosphonous acid, and mixtures in the amount of 10 to 100 parts by weight;
   c) organic compounds that will react with a phosphorus compound containing halides or a phosphorus oxyacid, and are a saturated or unsaturated aliphatic, aromatic, cyclic, aliphatic-aromatic or aliphatic-cyclic compound selected from the group consisting of alcohol polyalcohol, alkyl epoxides, polyepoxides, carboxylic acids and anhydrides, polycarboxylic acids and anhydrides, aldehydes, phenol, cresol, lignin, alkylalcoholamines, oils, fats, polyesters with hydroxyl or carboxylic radicals, carbohydrates, and mixtures thereof in the amount of 10 to 100 parts by weight of said organic compound; thereby producing an organic phosphorus-phosphorus oxyacid compound, and is utilized in the amount of 5 to 50 parts by weight;

3) carbonization auxiliaries, in the amount of 0 to 100 parts by weight;

4) metal-containing compound having a carbonization accelerating effect, in the amount of 0 to 30 parts by weight;

5) filler, in the amount of 0 to 200 parts by weight.

8. A flame retardant composition wherein the organic material is a flammable unsaturated polyester resin containing a free-radical initiator curing agent incorporated in or on a flame retardant amount of:

A) an organic phosphorus-phosphorus oxyacid compound and composition produced by mixing and/or mixing and heating, and reacting the following components in stoichiometric proportions:
   a) phosphorus compound containing halides selected from the group consisting of phosphorus trichloride, phosphorus oxytrichloride, phosphorus pentachloride and mixtures thereof, in the amount of 25 to 100 parts by weight;
   b) inorganic phosphorus oxyacid, selected from the group consisting of phosphoric acid, polyphosphoric acid, pyrophosphoric acid, triphosphoric acid, phosphinic acid, metaphosphoric acid, hypophosphorus acid, phosphonous acid, and mixtures in the amount of 10 to 100 parts by weight;
   c) organic compounds that will react with a phosphorus compound containing halides or a phosphorus oxyacid, and are a saturated or unsaturated aliphatic, aromatic, cyclic, aliphatic-aromatic or aliphatic-cyclic compound selected from the group consisting of alcohol, polyalcohol, alkyl epoxides, polyepoxides, carboxylic acids and anhydrides, polycarboxylic acids and anhydrides, aldehydes, phenol, cresol, lignin, alkylalcoholamines, oils, fats, polyesters with hydroxyl or carboxylic radicals, carbohydrates, and mixtures thereof in the amount of 10 to 100 parts by weight of said organic compound; thereby producing an organic phosphorus-phosphorus oxyacid compound;
   d) a metal containing compound having a carbonization accelerating effect, in the amount of 0 to 30 parts by weight;
   e) a carbonization auxiliaries, 0 to 100 parts by weight;
   f) a filler, in the amount of 0 to 200 parts by weight; thereby producing a flame retardant polyester resin; the components a–f being 5 to 50% by weight, based on the weight of the flammable organic material.

9. A flame retardant composition wherein the organic composition is a flammable unsaturated polyester resin containing a free-radical initiator curing agent incorporated in or on a flame retardant amount of:

A) an organic phosphorus-phosphorus oxyacid compound and composition produced by mixing and/or mixing and heating, and reacting the following components in stoichiometric proportions:
   a) phosphorus compound containing halides selected from the group consisting of phosphorus trichloride, phosphorus oxytrichloride, phosphorus pentachloride and mixtures thereof, in the amount of 25 to 100 parts by weight;
   b) inorganic phosphorus oxyacid, selected from the group consisting of phosphoric acid, polyphosphoric acid, pyrophosphoric acid, triphosphoric acid, phosphinic acid, metaphosphoric acid, hypophosphorus acid, phosphonous acid, and mixtures in the amount of 10 to 100 parts by weight;
   c) organic compounds that will react with a phosphorus compound containing halides or a phosphorus oxyacid, and are a saturated or unsaturated aliphatic, aromatic, cyclic, aliphatic-aromatic or aliphatic-cyclic compound selected from the group consisting of alcohol, polyalcohol, alkyl epoxides, polyepoxides, carboxylic acids and anhydrides, polycarboxylic acids and anhydrides, aldehydes, phenol, cresol, lignin, alkylalcoholamines, oils, fats, polyesters with hydroxyl or carboxylic radicals, carbohydrates, and mixtures thereof in the amount of 10 to 100 parts by weight of said organic compound thereby producing an organic phosphorus-phosphorus oxyacid compound;

d) a metal containing compound having a carbonization accelerating effect, in the amount of 0 to 30 parts by weight;

e) a carbonization auxiliaries, 0 to 100 parts by weight;

f) a filler, consisting of a wet Portland cement, in the amount of 0 to 200 parts by weight; thereby producing a flame retardant polyester resin;

the components a–f being 5 to 50% by weight, based on the weight of the flammable organic material.

10. A flame retardant composition wherein the flammable organic material is a flammable epoxy resin containing an epoxy curing agent incorporated in or on a flame retardant amount of:

A) an organic phosphorus-phosphorus oxyacid compound and composition produced by mixing and/or mixing and heating, and reacting the following components in stoichiometric proportions:

a) phosphorus compound containing halides selected from the group consisting of phosphorus trichloride, phosphorus oxytrichloride, phosphorus pentachloride and mixtures thereof, in the amount of 25 to 100 parts by weight;

b) inorganic phosphorus oxyacid, selected from the group consisting of phosphoric acid, polyphosphoric acid, pyrophosphoric acid, triphosphoric acid, phosphinic acid, metaphosphoric acid, hypophosphorus acid, phosphonous acid, and mixtures in the amount of 10 to 100 parts by weight;

c) organic compounds that will react with a phosphorus compound containing halides or a phosphorus oxyacid, and are a saturated or unsaturated aliphatic, aromatic, cyclic, aliphatic-aromatic or aliphatic-cyclic compound selected from the group consisting of alcohol, polyalcohol, alkyl epoxides, polyepoxides, carboxylic acids and anhydrides, polycarboxylic acids and anhydrides, aldehydes, phenol, cresol, lignin, alkylalcoholamines, oils, fats, polyesters with hydroxyl or carboxylic radicals, carbohydrates, and mixtures thereof in the amount of 10 to 100 parts by weight of said organic compound thereby producing an organic phosphorus-phosphorus oxyacid compound;

d) a metal containing compound having a carbonization accelerating effect, in the amount of 0 to 30 parts by weight;

e) a carbonization auxiliaries, 0 to 100 parts by weight;

f) a filler, in the amount of 0 to 200 parts by weight; thereby producing a flame retardant epoxy resin; the components a–f being 5 to 50% by weight, based on the weight of the flammable organic material.

11. A flame retardant composition wherein the flammable organic material are flammable polyurethane components which are reacted and incorporated in or on a flame retardant amount of:

A) an organic phosphorus-phosphorus oxyacid compound and composition produced by mixing and/or mixing and heating, and reacting the following components in stoichiometric proportions:

a) phosphorus compound containing halides selected from the group consisting of phosphorus trichloride, phosphorus oxytrichloride, phosphorus pentachloride and mixtures thereof, in the amount of 25 to 100 parts by weight;

b) inorganic phosphorus oxyacid, selected from the group consisting of phosphoric acid, polyphosphoric acid, pyrophosphoric acid, triphosphoric acid, phosphinic acid, metaphosphoric acid, hypophosphorus acid, phosphonous acid, and mixtures in the amount of 10 to 100 parts by weight;

c) organic compounds that will react with a phosphorus compound containing halides or a phosphorus oxyacid, and are a saturated or unsaturated aliphatic, aromatic, cyclic, aliphatic-aromatic or aliphatic-cyclic compound selected from the group consisting of alcohol, polyalcohol, alkyl epoxides, polyepoxides, carboxylic acids and anhydrides, polycarboxylic acids and anhydrides, aldehydes, phenol, cresol, lignin, alkylalcoholamines, oils, fats, polyesters with hydroxyl or carboxylic radicals, carbohydrates, and mixtures thereof in the amount of 10 to 100 parts by weight of said organic compound thereby producing an organic phosphorus-phosphorus oxyacid compound;

d) a metal containing compound having a carbonization accelerating effect, in the amount of 0 to 30 parts by weight;

e) a carbonization auxiliaries, 0 to 100 parts by weight;

f) a filler, in the amount of 0 to 200 parts by weight; thereby producing a flame retardant polyurethane product; the components a–f being 5 to 50% by weight, based on the weight of the flammable organic material.

12. A flame retardant composition wherein the flammable organic material is a flammable vinyl monomer containing a free-radical initiator curing system incorporated in or on a flame retardant amount of:

A) an organic phosphorus-phosphorus oxyacid compound and composition produced by mixing and/or mixing and heating, and reacting the following components in stoichiometric proportions:

a) phosphorus compound containing halides selected from the group consisting of phosphorus trichloride, phosphorus oxytrichloride, phosphorus pentachloride and mixtures thereof, in the amount of 25 to 100 parts by weight;

b) inorganic phosphorus oxyacid, selected from the group consisting of phosphoric acid, polyphosphoric acid, pyrophosphoric acid, triphosphoric acid, phosphinic acid, metaphosphoric acid, hypophosphorus acid, phosphonous acid, and mixtures in the amount of 10 to 100 parts by weight;

c) organic compounds that will react with a phosphorus compound containing halides or a phosphorus oxyacid, and are a saturated or unsaturated aliphatic, aromatic, cyclic, aliphatic-aromatic or aliphatic-cyclic compound selected from the group consisting of alcohol, polyalcohol alkyl epoxides, polyepoxides, carboxylic acids and anhydrides, polycarboxylic acids and anhydrides, aldehydes, phenol, cresol, lignin, alkylalcoholamines, oils, fats, polyesters with hydroxyl or carboxylic radicals, carbohydrates, and mixtures thereof in the amount of 10 to 100 parts by weight of said organic compound thereby producing an organic phosphorus-phosphorus oxyacid compound;

d) a metal containing compound having a carbonization accelerating effect, in the amount of 0 to 30 parts by weight;

e) a carbonization auxiliaries, 0 to 100 parts by weight;

f) a filler, in the amount of 0 to 200 parts by weight;

the components a–f being 5 to 50% by weight, based on the weight of the flammable organic material.

13. The organic phosphorus-phosphorus oxyacid compound produced by the process consisting of mixing and/or mixing and heating and reacting the following components in stoichimetric proporations:
   a) phosphorus compound containing halides selected from the group consisting of phosphorus trichloride, phosphorus oxytrichloride and phosphorus pentachloride, in the amount of 25 to 100 parts by weight;
   b) inorganic phosphorus oxyacid selected from the group consisting of phosphoric acid, polyphosphoric acid, pyrophosphoric acid, triphosphoric acid, phosphinic acid, metaphosphoric acid, hypophosphorus acid, phosphonous acid and mixtures thereof, in the amount of 10 to 100 parts by weight;
   c) organic compounds that will react with a phosphorus compound containing halides or an inorganic phosphorus oxyacid, are a saturated or unsaturated aliphatic, aromatic, cyclic, aliphatic-aromatic or aliphatic-cyclic compound selected from the group consisting of alcohol, polyalcohol, alkyl epoxides, polyepoxides, carboxylic acids and anhydrides, polycarboxylic acids and anhydrides, aldehydes, phenol cresol lignin, alkylalcoholamines, oils, fats, polyesters with hydroxyl or carboxylic radicals, carbohydrates, and mixtures thereof, in the amount of 10 to 100 parts by weight.

* * * * *